(12) United States Patent
Gonzalez De Prado

(10) Patent No.: US 6,708,035 B1
(45) Date of Patent: Mar. 16, 2004

(54) SYSTEM FOR TRANSMITTING ASYMMETRIC DATA IN A RADIOCOMMUNICATIONS SYSTEM

(75) Inventor: Jose Luis Gonzalez De Prado, Madrid (ES)

(73) Assignee: Alcatel, Paris (FR)

( * ) Notice: Subject to any disclaimer, the term of this patent is extended or adjusted under 35 U.S.C. 154(b) by 304 days.

(21) Appl. No.: 09/598,516

(22) Filed: Jun. 21, 2000

(30) Foreign Application Priority Data

May 24, 1999 (ES) ............................................. 9901414

(51) Int. Cl.[7] ................................................. H04Q 7/20
(52) U.S. Cl. ................. 455/446; 455/452.1; 455/562.1; 455/450; 455/11.1; 370/337
(58) Field of Search ............................. 455/450, 452.1, 455/509, 510, 512, 11.1, 562.1; 370/337, 347

(56) References Cited

U.S. PATENT DOCUMENTS

| 5,768,254 A | * | 6/1998 | Papadopoulos et al. ...... 370/201 |
| 5,805,576 A | * | 9/1998 | Worley et al. ............... 370/337 |
| 5,818,820 A | * | 10/1998 | Anderson et al. ............ 370/280 |
| 6,212,387 B1 | * | 4/2001 | McLaughlin et al. ........ 455/450 |
| 6,356,540 B1 | * | 3/2002 | Kojiro .......................... 370/330 |
| 6,393,007 B1 | * | 5/2002 | Haartsen ...................... 370/337 |
| 6,415,132 B1 | * | 7/2002 | Sabat, Jr. .................... 455/3.01 |
| 6,556,830 B1 | * | 4/2003 | Lenzo .......................... 455/450 |

* cited by examiner

*Primary Examiner*—William Trost
*Assistant Examiner*—Sharad Rampuria
(74) *Attorney, Agent, or Firm*—Sughrue Mion, PLLC

(57) ABSTRACT

System for transmitting asymmetric data in a radiocommunications system comprising a cell, in which a group of remote units is located, said cell being divided into at least two sectors.

A first fixed unit (11-1) and a second fixed unit (11-2) provide radio coverage for a first subset of remote units located within the first sector and a second subset of remote units located within said second sector, respectively. Both fixed units (11-1 and 11-2) are located at the same site.

Controller means (13) connected to both fixed units (11-1 and 11-2), record the radio channel and the sector in which an asymmetric communication is set up in the downlink direction of the transmission.

4 Claims, 1 Drawing Sheet

SYSTEM FOR TRANSMITTING ASYMMETRIC DATA IN A RADIOCOMMUNICATIONS SYSTEM

OBJECT OF THE INVENTION

The present invention relates to a method for transmitting data asymmetrically in a radiocommunications system which has at least one fixed unit whose coverage area is divided into sectors, and within each sector a group of remote units is located.

The fixed unit communicates with the remote units making joint use of time division multiple access (TDMA) and time division duplex (TDD) techniques. The data transmission method is of special, but not exclusive application, in a digital cordless telecommunications system (DECT) for the avoidance of interference between fixed units located at the same site and which cover boundary sectors of a given coverage area.

STATE OF THE ART

A radiocommunications system has its coverage area divided into several sectors such that each sector is covered by a radio receiver and a radio transmitter, both being incorporated in a fixed unit, so that several fixed units are located at the same site, each of them covering a different sector and these been adjacent.

A set of remote units is located in each sector so that each fixed unit communicates with the remote units situated within the sector associated with it. To implement communication joint use is made of time division multiple access (TDMA) and time division duplex (TDD) techniques.

The same frequency band is employed in all sectors. The carrier frequency is divided into time slots, which are grouped into frames, so that the allocation of a time slot in one direction of the communication, for example, the uplink direction, implies the automatic allocation of a duplex time slot, in the other direction of communication, in this case the downlink direction.

Consequently, the same radio channel (pair formed by a time slot and a frequency) can be used simultaneously for two communications in different sectors, adjacent or not.

The radio channel employed in a communication is selected by the remote unit, after analysis and evaluation of the power present in each downlink slot, and at each of the frequencies, making use of the dynamic channel allocation (DCA) procedure.

Though this is the most frequent case, it is possible to set up at least one asymmetric communication. In this case, at least two time slots of the same radio channel, downlink time slot and duplex slot, are used simultaneously for the downlink direction of the transmission.

When this type of communication is set up, interference arises in sectors adjacent to the sector in which the asymmetric communication has been set up, rendering inaudible a signal received over the same uplink channel used in a sector adjacent to the sector in which the asymmetric communication has been established.

This occurrence is due to the fact that the radio transmitter in the sector in which the asymmetric communication is set up uses a higher power level to transmit in the downlink direction than the power with which the radio receiver of the adjacent sector receives the bursts corresponding to the communication in process and transmitted from the radio transmitter of the remote units implicated in the communications.

This power difference is so great that, even though no remote unit in the sector or adjacent sectors select the same time slot on the same frequency for its symmetrical communications, the proximity with which the hexagonally arranged antennas are mounted for sweeping the different sectors, and the not entirely exact response of the filters, result in interference arising in the same time slot (used symmetrically) on another frequency, or in the adjacent time slots.

Consequently, there is a need to develop a method for transmitting information inside a time slot allocated to a communication, so that the possibility of experiencing interference due to its duplex time slot being used in an asymmetric communication in an adjacent sector is reduced, obtaining correct reception of the information contained in the time slot in a radio receiver of the fixed unit corresponding to another sector.

CHARACTERISATION OF THE INVENTION

To overcome the problems described above, a method of asymmetric data transmission is proposed for use by a fixed unit whose coverage area is divided, at least, into a first sector and a second sector.

In each sector a set of fixed and/or mobile remote units is located, which communicate by radio with a first fixed unit and a second fixed unit, respectively, so that both fixed units are located one beside the other and use the same frequency band.

When one of the two fixed units is transmitting asymmetric data such as IP (Internet Protocol) packets to a remote unit located in its associated sector, i.e., it occupies the pair of time slots corresponding to a radio channel, that is the time slot corresponding to the downlink half of the frame and the duplex time slot corresponding to the uplink half of the frame; interference is produced in the fixed unit whose sector is adjacent to the sector in which the asymmetric communication is taking place.

The method of the invention avoids interference, since controller means perform a checking process on all communication links engaged with calls going on, as well as on all requests to set up new calls in each of the sectors into which the coverage area is divided, in order to determine whether there are asymmetric communications and on which channels they have been set up.

Once the radio channels have been identified, the controller means insert a message with the identity of the channels occupied with asymmetric communications in the broadcast channel that each fixed unit has set up in order to prevent the remote units from initiating a communication over said channels.

Thus, a remote unit is prevented from selecting as best, a time slot that can be in use for an asymmetric communication in an adjacent sector. The controller means update the broadcast information in terms of the variation in traffic of the radiocommunications system.

BRIEF DESCRIPTION OF THE FIGURES

A more detailed explanation of the invention is given in the following description, based on the figures attached, in which.

DESCRIPTION OF THE INVENTION

Figure 1:
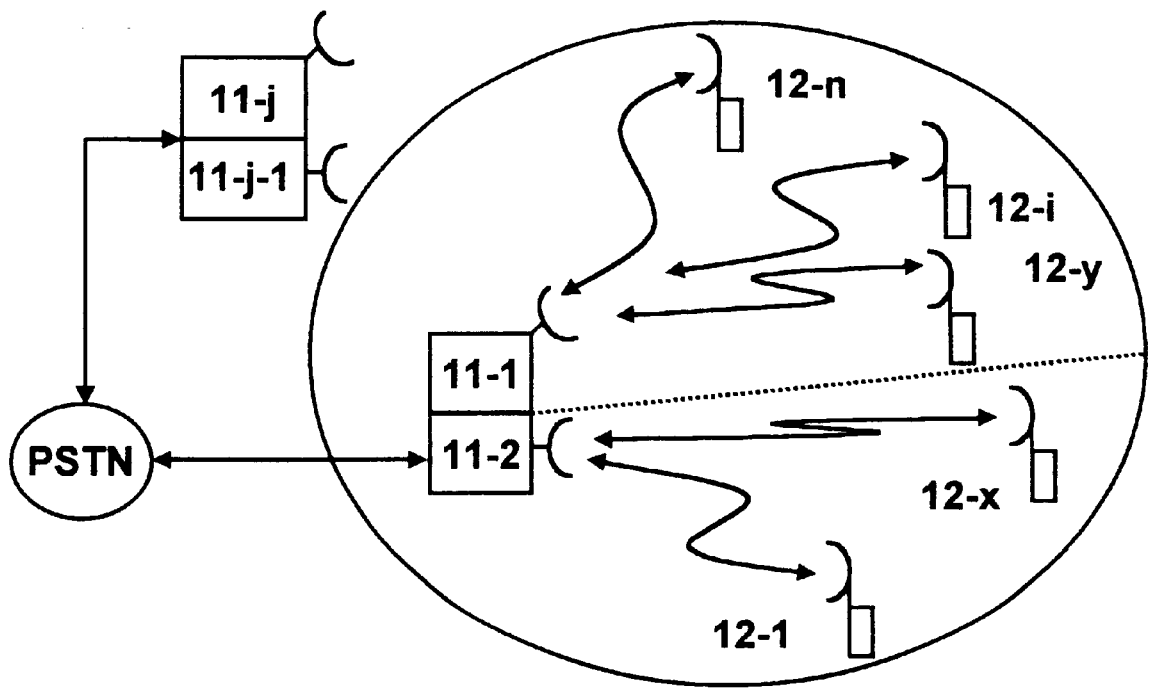
FIG. 1 shows a block diagram of a radiocommunications system according to the invention.

FIG. 1 shows an coverage area (cell), of a radiocommunications system, which is divided into at least two sectors S1 and S2 such that each sector S1, S2 has, respectively, associated a first fixed unit 11-1 and a second fixed unit 11-2. Both fixed units 11-1 and 11-2 are located at the same site. Also, both fixed units 11-1 and 11-2 are connected to a telephone network such as the public switched telephone network (PSTN), an Internet network, etc., for transmitting and receiving information such as voice, data, video or any digitised information, to and from a subscriber.

A group of fixed and/or mobile remote units 12-1 to 12-n is located in the cell so that a first subset of remote units 12-1 to 12-x is located in the first sector S1, and a second subset of remote units 12-y to 12-n is located in the second sector S2.

The group of remote units 12-1 to 12-n communicates by radio with the fixed units 11-1 and 11-2, so that in both sectors S1, S2 the same frequency band is used, and the communications are implemented by the joint use of time division multiple access (TDMA) and time division duplex (TDD) techniques, such that the allocation of a time slot in the uplink direction of the communication implies the automatic allocation of a duplex time slot in the downlink direction of the communication.

The time slots are grouped into frames, such that each frame comprises several time slots for each transmission direction and, normally, there is only one point at which the transmission direction changes, i.e., the frame is divided into two parts, one for each transmission direction.

Figure 2:
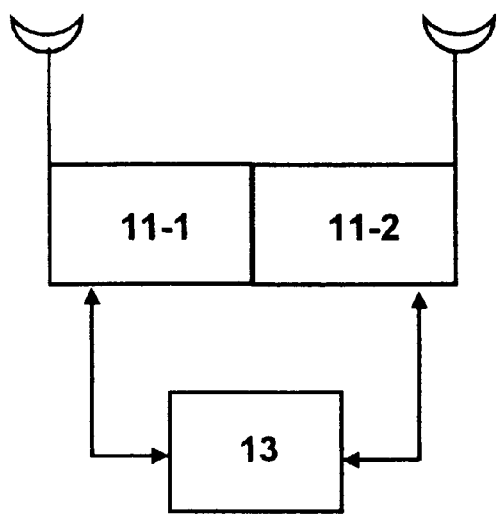
FIG. 2 shows a block diagram of some fixed units that cover a cell of the radiocommunications system according to the invention.

With relation to FIG. 2, controller means 13 are connected to both fixed units 11-1 and 11-2 for controlling the communications set up in both sectors S1 and S2, so that they determine when an asymmetric communication is set up in the downlink direction of the transmission, when the communication ends, in which sector S1 or S2 and over what radio channel of the frame it is established, and, consequently, they can insert information relative to the asymmetric communication(s) in the two pilot channels respectively generated by both fixed units 11-1 and 11-2, with the objective that one remote unit 12-i (where i=1, . . . , n), and belonging to one of the two subsets, avoids making set-up requests for a new communication in an uplink time slot which is being used in an asymmetric communication in the sector adjacent to its sector.

The controller means 13 draw up a list by sector with the time slots engaged in channels with asymmetric traffic in each sector S1, S2, the list being updated frame by frame.

The remote unit 12-i selects a radio channel (carrier frequency and time slot) for setting up a communication and proposes this to its fixed unit 11-j (where j=1, . . . , m) for confirmation. The choice is made using a procedure known as dynamic channel allocation (DCA), which evaluates the reception conditions of each radio channel possible in the remote unit 12-i, and selects an optimum radio channel.

The broadcast service performed over each pilot channel shall indicate which radio channels are to be avoided by the DCA procedure of each remote unit 12-i, i.e., the DCA selection procedure of the remote unit 12-i shall give bottom priority to the eligible combinations in which there are asymmetric communications established in the sector S1 or S2 adjoining, respectively.

This does not mean these combinations cannot be chosen, since the appearance of interference is not assured, it is simply a matter of avoiding as much as possible the choice of such radio channels by the DCA procedure.

In the event that a request for a traffic channel implies the setting up of a radio channel for asymmetric data packet service such as IP (Internet Protocol) traffic, then it is necessary the allocation of at least two time slots in the downlink direction of the transmission for transporting information relative to the communication in course, the time slots being adjacent or not.

The demand for more than one time slot for one transmission direction is made on a basis of the nature of the information to be transmitted.

In brief, the fixed unit 11 -j, over its pilot channel, broadcasts information relative to the time slots engaged with asymmetric traffic channels in its sector, S1 or S2, in which the asymmetric communication is set up, for the purpose of avoiding a remote unit 12-i from selecting to set up and/or continue with a communication over a duplex time slot that is being used to carry out an asymmetric communication in the adjacent sector.

Thus, interference, such as loss of packets, is avoided due to the allocation of a time slot for a communications session such that the same time slot is being used in an asymmetric communication in an adjacent sector. Consequently, a more efficient use is made of the limited radio resources of a radiocommunications system, such as a digital cordless telecommunications system (DECT), when communications are set up between two subscribers so that a greater quantity of information is transmitted in one direction of the communication than in the opposite.

What is claimed is:

1. A system for transmitting asymmetric data in a radiocommunications system comprising:

at least one cell in which a group of remote units is located, said cell being divided into at least a first sector and a second sector, so that a first fixed unit provides radio coverage for a first subset of remote units, fixed and/or mobile, located within said first sector, and a second fixed unit provides radio coverage for a second subset of remote units, fixed and/or mobile, located within said second sector, both of said fixed units being located in the same site, such that at least one asymmetric communication is established in [the] a downlink direction of the transmission;

characterized in that said system comprises controller means connected to said first fixed unit and to said second fixed unit, and is adapted for recording the radio channel and the sector over which said asymmetric communication is set up in the downlink direction of the transmission, wherein said system is a TDMA/TDD system that employs a common frequency in each transmission direction.

2. System for transmitting asymmetric data according to claim 1, characterised in that said controller means (13) is adapted for generating a first list of radio channels to avoid their selection in said first sector (S1) and a second list of radio channels to avoid their selection in said second sector (S2), said lists being periodically updated.

3. System for transmitting asymmetric data according to claim 2, characterised in that said controller means (13) is adapted for sending said first list to said first fixed unit (11-1) for broadcasting the same over a pilot channel generated by said first fixed unit (11-1), for the purpose that said first subset of remote units (12-1 to 12-x) avoids using a time slot, in the uplink direction of the transmission, that is being used in an asymmetric communication in said second sector (S2).

4. System for transmitting asymmetric data according to claim 2, characterised in that said controller means (13) is adapted for sending said second list to said second fixed unit (11-2) for broadcasting the same over a pilot channel generated by said second fixed unit (11-2), for the purpose that said second subset of remote units (12-y to 12-n) avoids using a time slot, in the uplink direction of the transmission, that is being used in an asymmetric communication in said first sector (S1).

* * * * *